(12) United States Patent
Kim et al.

(10) Patent No.: US 11,142,037 B2
(45) Date of Patent: Oct. 12, 2021

(54) THERMAL MANAGEMENT SYSTEM FOR VEHICLE

(71) Applicants: Hyundai Motor Company, Seoul (KR); Kia Motors Corporation, Seoul (KR)

(72) Inventors: Jae Yeon Kim, Hwaseong-si (KR); Su Whan Kim, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 222 days.

(21) Appl. No.: 16/369,557

(22) Filed: Mar. 29, 2019

(65) Prior Publication Data
US 2020/0171913 A1 Jun. 4, 2020

(30) Foreign Application Priority Data
Dec. 3, 2018 (KR) .................. 10-2018-0153592

(51) Int. Cl.
*B60H 1/00* (2006.01)
*H01M 10/625* (2014.01)
*B60H 1/14* (2006.01)

(52) U.S. Cl.
CPC ..... *B60H 1/00278* (2013.01); *B60H 1/00878* (2013.01); *B60H 1/143* (2013.01); *H01M 10/625* (2015.04); *B60H 2001/003* (2013.01); *B60H 2001/00307* (2013.01)

(58) Field of Classification Search
CPC ............ B60H 1/00278; B60H 1/00878; B60H 1/143; B60H 2001/00307; B60H 2001/003; B60K 11/02; H05K 7/20881; H05K 7/20936; H01M 10/625; Y02E 60/10; Y02T 10/70
See application file for complete search history.

(56) References Cited

U.S. PATENT DOCUMENTS

| | | | | |
|---|---|---|---|---|
| 5,490,572 A | * | 2/1996 | Tajiri | B60H 1/00392 180/65.1 |
| 5,507,153 A | * | 4/1996 | Seto | B60L 1/003 62/133 |
| 5,549,153 A | * | 8/1996 | Baruschke | B60L 58/26 165/42 |
| 5,641,016 A | * | 6/1997 | Isaji | B60H 1/00914 165/43 |

(Continued)

FOREIGN PATENT DOCUMENTS

JP 5336033 B2 11/2013

*Primary Examiner* — Ljiljana V. Ciric
(74) *Attorney, Agent, or Firm* — Morgan Lewis & Bockius LLP (57) ABSTRACT

A thermal management system for a vehicle includes a cooling device which includes a radiator, electrical components, and at least one water pump which are connected through a coolant line, to circulate a coolant through the coolant line to supply the coolant to the electrical components and an oil cooler which is mounted on the coolant line and connected to a drive motor to cool the drive motor; and an HVAC module which has a heater connected to the coolant line through first and second connection lines to supply the coolant with a temperature which is increased as the coolant passes through the electrical components and the oil cooler in a heating mode of a vehicle.

17 Claims, 8 Drawing Sheets

(56) References Cited

U.S. PATENT DOCUMENTS

| | | | | |
|---|---|---|---|---|
| 5,678,760 A * | 10/1997 | Muso | ................ | H01M 10/613 237/2 A |
| 5,896,833 A * | 4/1999 | Aoki | ................ | F02B 29/0443 123/41.14 |
| 5,899,086 A * | 5/1999 | Noda | ................ | B60H 1/00914 62/244 |
| 5,937,664 A * | 8/1999 | Matsuno | ............ | B60H 1/00278 62/259.2 |
| 5,971,290 A * | 10/1999 | Echigoya | ........... | B60H 1/00485 237/12.3 A |
| 6,138,466 A * | 10/2000 | Lake | ................ | H01M 10/6568 62/199 |
| 6,357,541 B1 * | 3/2002 | Matsuda | ................ | B60K 6/22 180/68.2 |
| 6,394,210 B2 * | 5/2002 | Matsuda | ........... | H01M 10/6568 180/68.1 |
| 6,467,286 B2 * | 10/2002 | Hasebe | ............... | H01M 10/667 62/185 |
| 6,604,576 B2 * | 8/2003 | Noda | ................ | B60H 1/00878 165/202 |
| 6,640,889 B1 * | 11/2003 | Harte | ................ | B60H 1/00885 165/202 |
| 6,862,892 B1 * | 3/2005 | Meyer | ............... | B60H 1/00878 165/42 |
| 6,978,628 B2 * | 12/2005 | Honda | .................. | B60H 1/004 62/134 |
| 7,013,659 B2 * | 3/2006 | Yoshida | ................ | H01M 10/63 62/186 |
| 7,147,071 B2 * | 12/2006 | Gering | ................... | B60L 58/27 237/12.3 B |
| 7,600,391 B2 * | 10/2009 | Naik | .................... | B60H 1/3208 62/238.6 |
| 7,789,176 B2 * | 9/2010 | Zhou | .................. | B60H 1/32281 180/65.1 |
| 7,841,431 B2 * | 11/2010 | Zhou | .................. | B60H 1/00278 180/65.1 |
| 7,975,757 B2 * | 7/2011 | Nemesh | ............. | B60H 1/32281 165/42 |
| 8,215,432 B2 * | 7/2012 | Nemesh | ............. | B60H 1/00278 180/68.2 |
| 8,336,319 B2 * | 12/2012 | Johnston | ................ | B60K 1/00 62/79 |
| 8,448,696 B2 * | 5/2013 | Johnston | ................ | B60L 58/18 165/104.32 |
| 8,752,660 B2 * | 6/2014 | Ajisaka | ................... | B60K 11/06 180/68.1 |
| 8,798,875 B2 * | 8/2014 | Yanagisawa | ............ | B60K 6/46 701/50 |
| 9,309,982 B2 * | 4/2016 | Akiyama | ............... | B60L 3/0069 |
| 9,561,704 B2 * | 2/2017 | Enomoto | ................ | F01P 7/165 |
| 9,604,627 B2 * | 3/2017 | Yamanaka | ............ | B60W 10/30 |
| 9,643,469 B2 * | 5/2017 | Kakehashi | ................ | B60H 1/04 |
| 9,649,909 B2 * | 5/2017 | Enomoto | ............. | B60W 20/00 |
| 9,650,940 B2 * | 5/2017 | Kakehashi | ......... | B60H 1/32284 |
| 9,694,646 B2 * | 7/2017 | Takeuchi | ................ | F25B 6/04 |
| 9,701,215 B1 * | 7/2017 | Kim | .................. | B60L 58/26 |
| 9,827,824 B2 * | 11/2017 | Enomoto | ................. | B60H 1/22 |
| 9,878,591 B2 * | 1/2018 | Taniguchi | .......... | B60H 1/00278 |
| 10,076,944 B2 * | 9/2018 | Jalilevand | ............ | B60H 1/3202 |
| 10,118,458 B2 * | 11/2018 | Kim | ................... | B60H 1/00385 |
| 10,166,835 B2 * | 1/2019 | Kim | ................... | B60H 1/00385 |
| 10,173,491 B2 * | 1/2019 | Kim | ................... | B60H 1/00921 |
| 10,183,544 B2 * | 1/2019 | Kim | ...................... | F25B 25/005 |
| 10,211,493 B2 * | 2/2019 | Janarthanam | ......... | H01M 10/48 |
| 10,259,286 B2 * | 4/2019 | Janier | ..................... | B60K 11/02 |
| 10,322,617 B2 * | 6/2019 | Kohl | ...................... | B60L 58/27 |
| 10,340,563 B2 * | 7/2019 | Blatchley | ............ | H01M 10/663 |
| 10,562,367 B2 * | 2/2020 | Oh | ...................... | B60H 1/00392 |
| 10,563,563 B2 * | 2/2020 | Son | ........................... | F01P 3/20 |
| 10,688,847 B2 * | 6/2020 | Kim | .................. | B60H 1/00899 |
| 10,710,425 B2 * | 7/2020 | Jalilevand | .......... | B60H 1/00278 |
| 10,717,337 B2 * | 7/2020 | Kim | .................. | B60H 1/00278 |
| 10,814,692 B2 * | 10/2020 | Kim | .................. | B60H 1/32284 |
| 10,829,005 B2 * | 11/2020 | Onozawa | ............ | H01M 10/625 |
| 10,889,157 B2 * | 1/2021 | Kim | .................. | B60H 1/00278 |
| 10,974,566 B2 * | 4/2021 | Kim | .................. | B60H 1/00278 |
| 11,001,122 B2 * | 5/2021 | Ajisaka | ............. | B60H 1/32331 |
| 2002/0043413 A1 * | 4/2002 | Kimishima | ......... | H01M 10/613 180/68.1 |
| 2003/0116105 A1 * | 6/2003 | Pfeffinger | ........... | F16H 57/0412 123/41.31 |
| 2011/0088959 A1 * | 4/2011 | Corley | ................... | F02B 61/00 180/65.245 |
| 2012/0159986 A1 * | 6/2012 | Imanishi | ................. | B60L 1/003 62/498 |
| 2012/0297809 A1 * | 11/2012 | Carpenter | ............... | B60L 50/66 62/244 |
| 2016/0209099 A1 * | 7/2016 | Liu | ....................... | F25B 47/022 |
| 2016/0297280 A1 * | 10/2016 | Riederer | ............... | F25B 21/02 |
| 2016/0361967 A1 * | 12/2016 | Gawthrop | ............. | B60H 1/004 |
| 2017/0008373 A1 * | 1/2017 | Makihara | .............. | B60H 1/00828 |
| 2017/0028813 A1 * | 2/2017 | Enomoto | ................. | B60H 1/24 |
| 2017/0373359 A1 * | 12/2017 | Krull | .................. | B60K 11/02 |
| 2018/0142936 A1 * | 5/2018 | Kakehashi | ............. | F25D 17/02 |
| 2018/0264913 A1 * | 9/2018 | Enomoto | .................. | F01P 7/161 |
| 2019/0039439 A1 * | 2/2019 | Aldridge | ................. | H02K 9/19 |
| 2019/0070924 A1 * | 3/2019 | Mancini | ............ | B60H 1/00278 |
| 2019/0118610 A1 * | 4/2019 | Johnston | ............ | B60H 1/00899 |
| 2019/0120118 A1 * | 4/2019 | Son | .......................... | F01P 3/20 |

* cited by examiner

THERMAL MANAGEMENT SYSTEM FOR VEHICLE

CROSS-REFERENCE TO RELATED APPLICATION

The present application claims priority to Korean Patent Application No. 10-2018-0153592 filed on Dec. 3, 2018, the entire contents of which is incorporated herein for all purposes by this reference.

BACKGROUND OF THE INVENTION

Field of the Invention

The present invention relates to a thermal management system for a vehicle, and more particularly, to a thermal management system for a vehicle, which improves a performance of cooling electrical components and a drive motor in an electric vehicle and improves heat efficiency by recovering waste heat generated from the electrical components and the drive motor.

Description of Related Art

Recently, an electric vehicle, as a future transportation means, is in the limelight in view of environmental problems and problems with energy resources which are considered important issues. The electric vehicle utilizes a rechargeable battery, which has multiple rechargeable battery cells integrated into a single pack, as a main power source, and thus the electric vehicle releases no exhaust gas and causes less noise.

The electric vehicle is driven by a drive motor that operates by being supplied with electric power from the battery. Furthermore, in addition to multiple electronic devices used for convenience devices, the electric vehicle has electrical components for controlling and managing the drive motor and charging the battery.

Meanwhile, because the battery and the electrical components as well as the drive motor used as the main power source for the electric vehicle release a very large amount of heat, it is necessary to efficiently cool the battery, the electrical components, and the drive motor. Therefore, it is very important to efficiently manage temperatures of the drive motor, the electrical components related to the drive motor, and the battery.

Generally, separate cooling systems are adopted to adjust the temperatures of the drive motor, the electrical components, and the battery, but there is a problem in that there is a limitation in terms of a space because capacities of the cooling systems need to be increased in accordance with sizes of the drive motor and the battery. Furthermore, the increase in capacities of the cooling systems also causes a problem that electric power required to operate the cooling systems is increased.

Therefore, there is a demand for development of a technology of the electric vehicle that adjusts the temperatures of the drive motor, the electrical components, and the battery and efficiently utilizes waste heat generated from the drive motor and the electrical components to ensure durability of the drive motor, the electrical components, and the battery and maximize energy efficiency.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a thermal management system for a vehicle, which improves a performance of cooling electrical components and a drive motor in an electric vehicle and improves heat efficiency by recovering waste heat generated from the electrical components and the drive motor and using the waste heat to heat a vehicle interior.

Various aspects of the present invention are directed to providing a thermal management system for a vehicle, the thermal management system including: a cooling device which may include a radiator, electrical components, and at least one water pump which are connected through a coolant line, and circulates a coolant through the coolant line to supply the coolant to the electrical components and an oil cooler which is mounted on the coolant line and connected to a drive motor to cool the drive motor; and an HVAC module which has therein a heater connected to the coolant line through first and second connection lines to supply the coolant with a temperature which is increased as the coolant passes through the electrical components and the oil cooler in a heating mode of a vehicle.

The drive motor may be connected to the oil cooler through an oil line, and an oil pump may be mounted on the oil line.

The oil pump may operate when cooling the drive motor or recovering waste heat generated from the drive motor.

The first connection line may be connected, through a valve, to the coolant line provided between the radiator and the oil cooler, and the second connection line may be connected to the coolant line provided between the radiator and the water pump.

When cooling the electrical components, the first and second connection lines may be closed by an operation of the valve, and the coolant cooled in the radiator may be supplied to the electrical components and the oil cooler by an operation of the water pump.

In the heating mode of the vehicle, a portion of the coolant line, which is connected to the radiator based on the first connection line, may be closed in a state in which the first and second connection lines are opened by the operation of the valve, and the coolant with the temperature, which is increased as the coolant passes through the electrical components and the oil cooler by the operation of the water pump, may be supplied to the heater without passing through the radiator.

When cooling the electrical components and the oil cooler in the heating mode of the vehicle, a portion of the coolant line, which is connected to the radiator based on the first connection line, may be opened in a state in which the first and second connection lines are opened by the operation of the valve, a portion of the coolant with the temperature, which is increased as the coolant passes through the electrical components and the oil cooler by the operation of the water pump, may be supplied to the heater without passing through the radiator, and the remaining portion of the coolant may pass through the radiator and may be supplied to the electrical components and the oil cooler.

The valve may be a three-way valve configured for distributing the amount of the coolant.

A reservoir tank may be mounted on the coolant line between the water pump and the second connection line connected to the coolant line.

The HVAC module may further include an opening/closing door which is provided between the heater and an evaporator included in an air conditioning device and adjusts outside air to allow the outside air to selectively pass through the heater to the evaporator.

The HVAC module may further include an air heater which is provided at a side opposite to the evaporator with the heater mounted between the evaporator and the air heater.

A coolant heater may be mounted on the first connection line.

The two drive motors may be provided to correspond to a front wheel and a rear wheel, respectively, the two oil coolers may be provided to correspond to the two drive motors, respectively, and one of the two oil coolers may be disposed in parallel with the other oil cooler mounted on the coolant line with a third connection line mounted on the coolant line.

One oil cooler may be disposed in parallel with the other oil cooler mounted on the coolant line with the third connection line mounted on the coolant line.

The water pump may be disposed on the coolant line adjacent to the radiator based on the third connection line, and a sub-water pump may be mounted on the coolant line connected to the other oil cooler based on the third connection line.

The electrical components may include an inverter and a charger (on board charger, OBC).

According to the thermal management system for a vehicle according to the exemplary embodiment of the present invention, it is possible to ensure a performance of cooling the electrical components and the drive motor that release a large amount of heat in the electric vehicle, and it is possible to simplify the entire system and improve durability of the electrical components and the drive motor.

Furthermore, according to an exemplary embodiment of the present invention, it is possible to improve heat efficiency by recovering waste heat generated from the electrical components and the drive motor and using the waste heat to heat the vehicle interior.

Furthermore, according to an exemplary embodiment of the present invention, it is possible to increase an overall traveling distance of the electric vehicle by minimizing electric power consumption by efficiently adjusting temperatures to allow the electrical components and the drive motor to exhibit optimum performances.

Furthermore, it is possible to reduce manufacturing costs and a weight and improve spatial utilization by simplifying the entire system.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments of the present invention, it will be understood that the present description is not intended to limit the invention(s) to those exemplary embodiments. On the other hand, the invention(s) is/are intended to cover not only the exemplary embodiments of the present invention, but also various alternatives, modifications, equivalents and other embodiments, which may be included within the spirit and scope of the invention as defined by the appended claims.

An exemplary embodiment of the present invention will hereinafter be described in detail with reference to the accompanying drawings.

Therefore, the exemplary embodiment and the configurations illustrated in the drawings are just the best exemplary embodiments of the present invention and do not represent all the technical spirit of the present invention. Accordingly, it should be appreciated that various equivalents and modified examples configured for substituting the exemplary embodiments may be made at the time of filing the present application.

A part irrelevant to the description will be omitted to clearly describe the present invention, and the same or similar constituent elements will be designated by the same reference numerals throughout the specification.

The size and thickness of each component illustrated in the drawings are arbitrarily shown for understanding and ease of description, but the present invention is not limited thereto. Thicknesses of several portions and regions are enlarged for clearly describing the above.

Throughout the specification, unless explicitly described to the contrary, the word "comprise/include" and variations such as "comprises/includes" or "comprising/including" will be understood to imply the inclusion of stated elements but not the exclusion of any other elements.

Furthermore, the term "unit", "means", "part", "member", or the like, which is described in the specification, means a unit of a comprehensive configuration that performs at least one function or operation.

Figure 1:
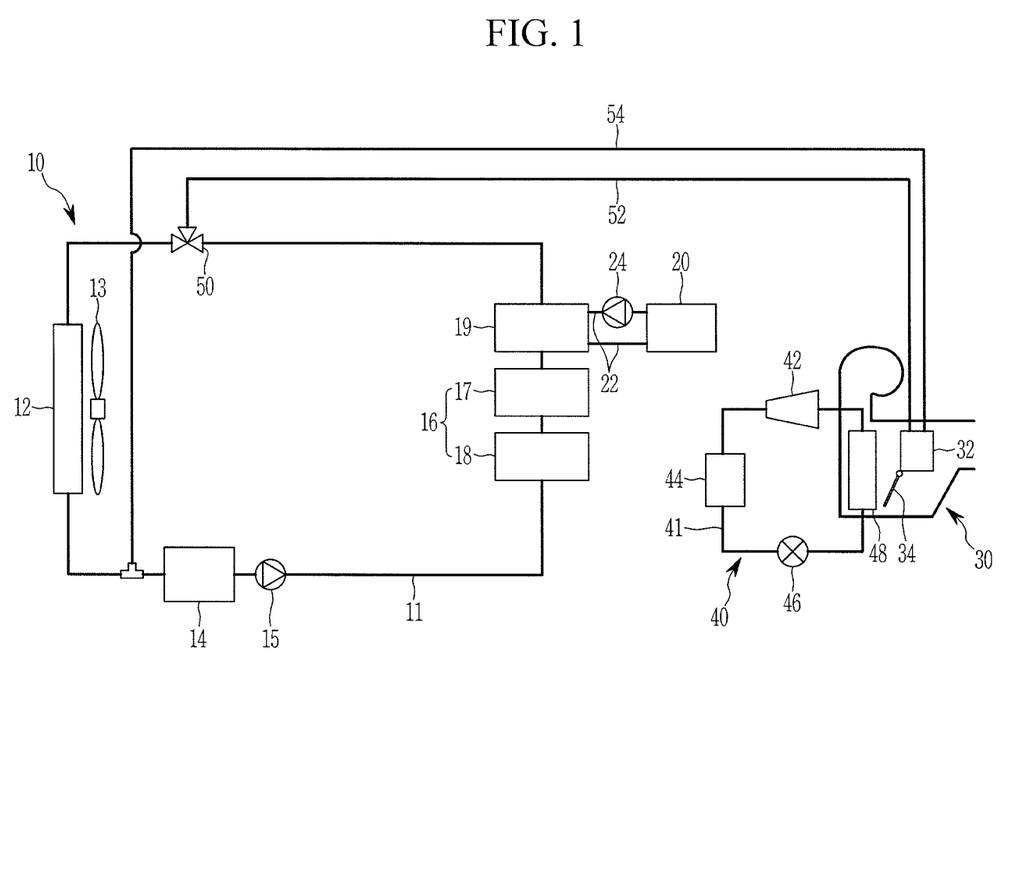
FIG. 1 is a block configuration view of a thermal management system for a vehicle according to various exemplary embodiments of the present invention.

FIG. 1 is a block configuration view of a thermal management system for a vehicle according to various exemplary embodiments of the present invention.

The thermal management system for a vehicle according to the various exemplary embodiments of the present invention may improve a performance of cooling electrical components and a drive motor in an electric vehicle, recover waste heat generated from the electrical components and the drive motor, and use the waste heat to heat a vehicle interior.

The thermal management system may be applied to an electric vehicle.

Referring to FIG. 1, the thermal management system may include a cooling device 10 and an HVAC (heating, ventilation, and air conditioning) module 30.

First, the cooling device 10 includes a radiator 12, electrical components 16, and at least one water pump 15 which are connected through a coolant line 11.

The radiator 12 is disposed at a front side of a vehicle, a cooling fan 13 is provided at a rear side of the radiator 12, and the radiator 12 cools a coolant through an operation of the cooling fan 13 and heat exchange with outside air.

Furthermore, the electrical components 16 include an inverter 17 and a charger 18 (on board charger, OBC). Meanwhile, the electrical components 16 may further include an electric power control unit (EPCU).

The electrical components 16 configured as described above are mounted on the coolant line 11 and may be cooled in a water-cooled manner.

Therefore, in a case in which waste heat is recovered from the electrical components 16 in a heating mode of the vehicle, heat, which is generated from the inverter 17, the charger 18, or the electric power control unit, may be recovered.

The cooling device 10 circulates the coolant through the coolant line 11 to supply the coolant to the electrical components 16 and an oil cooler 19 which is mounted on the coolant line 11 and connected to a drive motor 20 to cool the drive motor 20.

In the exemplary embodiment of the present invention, the drive motor 20 may be connected to the oil cooler 19 through an oil line 22, and an oil pump 24 may be mounted on the oil line 22.

That is, the oil cooler 19 may use the coolant, which is supplied from the radiator 12, to cool oil to be supplied to the drive motor 20.

When the drive motor 20 is required to be cooled, the oil pump 24 may selectively operate to supply the cooled oil to the drive motor 20.

Furthermore, the oil pump 24 may also operate when waste heat generated from the drive motor 20 is recovered in the heating mode of the vehicle.

That is, the oil cooled by the oil cooler 19 cools the drive motor 20 through the oil line 22, such that a temperature of the oil is increased. The oil with the increased temperature may increase a temperature of the coolant while being cooled by exchanging heat with the coolant in the oil cooler 19.

The waste heat generated from the drive motor 20 may be recovered through the aforementioned operation.

Therefore, in a case in which the waste heat is recovered from first and second electrical components 116a and 116b in the heating mode of the vehicle, the waste heat may be recovered from first and second inverters 117a and 117b, first and second chargers 118a and 118b, and first and second drive motors 120a and 120b.

Furthermore, the HVAC module 30 may have therein a heater 32 which is connected to the coolant line 11 through first and second connection lines 52 and 54 to supply the coolant with the temperature which is increased as the coolant passes through the electrical components 16 and the oil cooler 19 in the heating mode of the vehicle.

The HVAC module 30 may further include an opening/closing door 34 which is provided between the heater 32 and an evaporator 48 included in the air conditioning device 40 and adjusts outside air to allow the outside air to selectively pass through the heater 32.

Here, the air conditioning device 40 may further include a compressor 42, a condenser 44, and an expansion valve 46 which are connected through a refrigerant line 41.

The air conditioning device 40 configured as described above may operate when cooling a vehicle interior by use of thermal energy produced when a phase of a refrigerant is changed while the refrigerant passes through the compressor 42, the condenser 44, the expansion valve 46, and the evaporator 48.

Meanwhile, in the exemplary embodiment of the present invention, the first connection line 52 may be connected, through a valve 50, to the coolant line 11 provided between the radiator 12 and the oil cooler 19.

That is, one end portion of the first connection line 52 is connected to the coolant line 11 through the valve 50, and the other end portion of the first connection line 52 is connected to the heater 32.

Here, the valve 50 may be a three-way valve configured for distributing the amount of the coolant. In the heating mode or when the electrical components 16 and the oil cooler 19 are required to be cooled, the valve 50 may distribute the amount of the coolant to be supplied to the coolant line 11 and the first connection line 52 and supply the coolant.

Furthermore, one end portion of the second connection line 54 may be connected to the heater 32, and the other end portion of the second connection line 54 may be connected to the coolant line 11 provided between the radiator 12 and the water pump 15.

Here, a reservoir tank 14 may be mounted on the coolant line 11 between the water pump 15 and the second connection line 54 connected to the coolant line 11.

In an exemplary embodiment of the present invention, a controller is connected to the valve 50, the water pump 15 and the door 34 so that the controller can perform the thermal management by controlling the valve 50, the water pump 15 and the door 34.

Hereinafter, an operation and a process of the thermal management system for a vehicle according to the various exemplary embodiments of the present invention, which is configured as described above, will be described in detail with reference to FIGS. 2 to 5.

First, a process in which the thermal management system for a vehicle according to the various exemplary embodiments of the present invention cools the electrical components 16 will be described with reference to FIG. 2.

Figure 2:
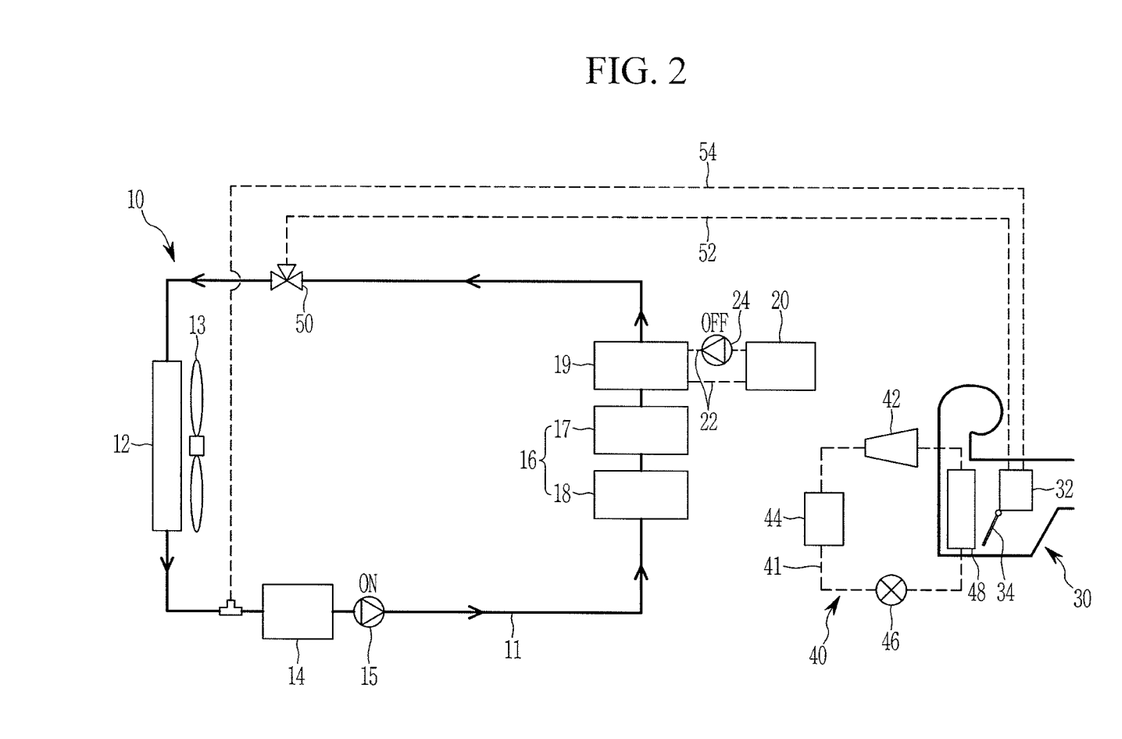
FIG. 2 is an operational view exemplarily illustrating a state in which the thermal management system for a vehicle according to the various exemplary embodiments of the present invention cools electrical components.

FIG. 2 is an operational view exemplarily illustrating a state in which the thermal management system for a vehicle according to the various exemplary embodiments of the present invention cools the electrical components.

Referring to FIG. 2, the cooling device 10 operates to cool the electrical components 16 and the oil cooler 19.

Here, the first and second connection lines 52 and 54 are closed by the operation of the valve. That is, as the first and second connection lines 52 and 54 are closed, the supply of the coolant to the heater 32 is stopped.

As such, the coolant cooled in the radiator 12 may be circulated through the coolant line 11 by the operation of the water pump 15 and thus supplied to the electrical components 16 and the oil cooler 19. Therefore, the electrical components 16 and the oil cooler 19 may be efficiently cooled.

Meanwhile, the operation of the oil pump 24 may be in a stopped state because the drive motor 20 is not required to be cooled.

Therefore, the oil line 22 is closed, and the supply of the oil to the drive motor 20 is stopped.

In the exemplary embodiment of the present invention, a process of cooling the electrical components 16 and the drive motor 20 will be described with reference to FIG. 3.

Figure 3:
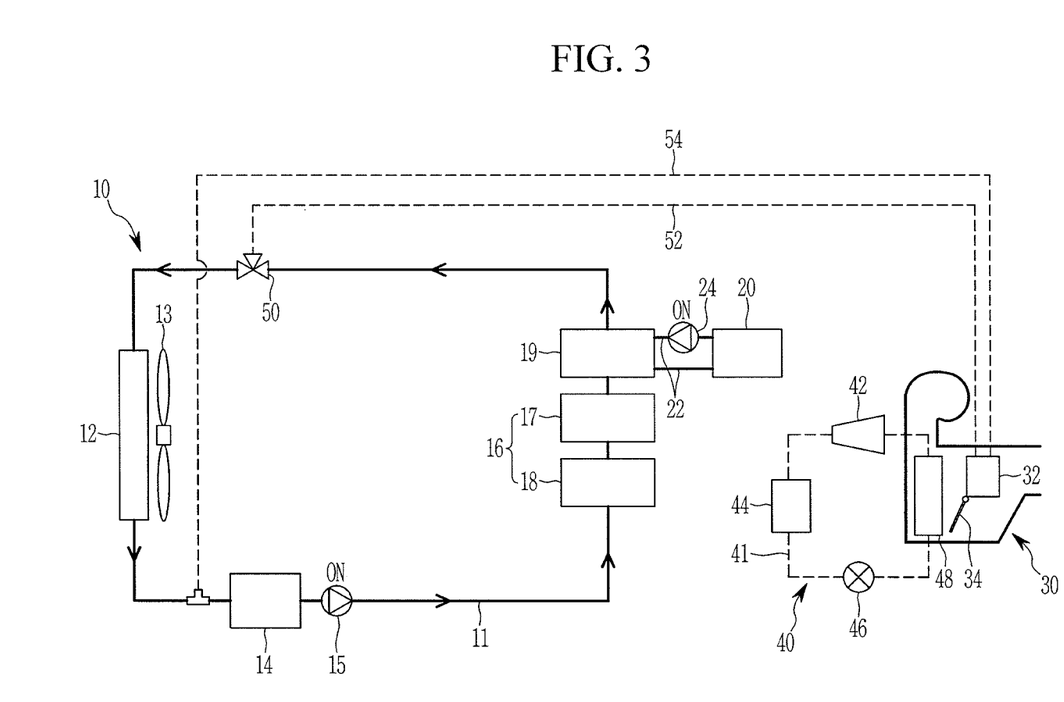
FIG. 3 is an operational view exemplarily illustrating a state in which the thermal management system for a vehicle according to the various exemplary embodiments of the present invention cools the electrical components and a drive motor.

FIG. 3 is an operational view exemplarily illustrating a state in which the thermal management system for a vehicle according to the various exemplary embodiments of the present invention cools the electrical components, the oil cooler, and the drive motor.

Referring to FIG. 3, the cooling device 10 operates to cool the electrical components 16 and the oil cooler 19.

Here, the first and second connection lines 52 and 54 are closed by the operation of the valve. Therefore, the supply of the coolant to the heater 32 is stopped.

As such, the coolant cooled in the radiator 12 may be circulated through the coolant line 11 by the operation of the water pump 15 and thus supplied to the electrical components 16 and the oil cooler 19.

Simultaneously, the oil pump 24 operates to supply the drive motor 20 with the oil cooled in the oil cooler 19, and the oil line 22 may remain opened by the operation of the oil pump 24.

Therefore, the drive motor 20 is cooled by being supplied with the cooled oil from the oil cooler 19.

That is, when the electrical components 16 and the drive motor 20 are required to be cooled, the aforementioned process is repeatedly performed, such that the electrical components 16 and the drive motor 20 may be efficiently cooled.

In the exemplary embodiment of the present invention, a process of recovering waste heat from the electrical components 16 and the drive motor 20 in the heating mode of the vehicle will be described with reference to FIG. 4.

Figure 4:
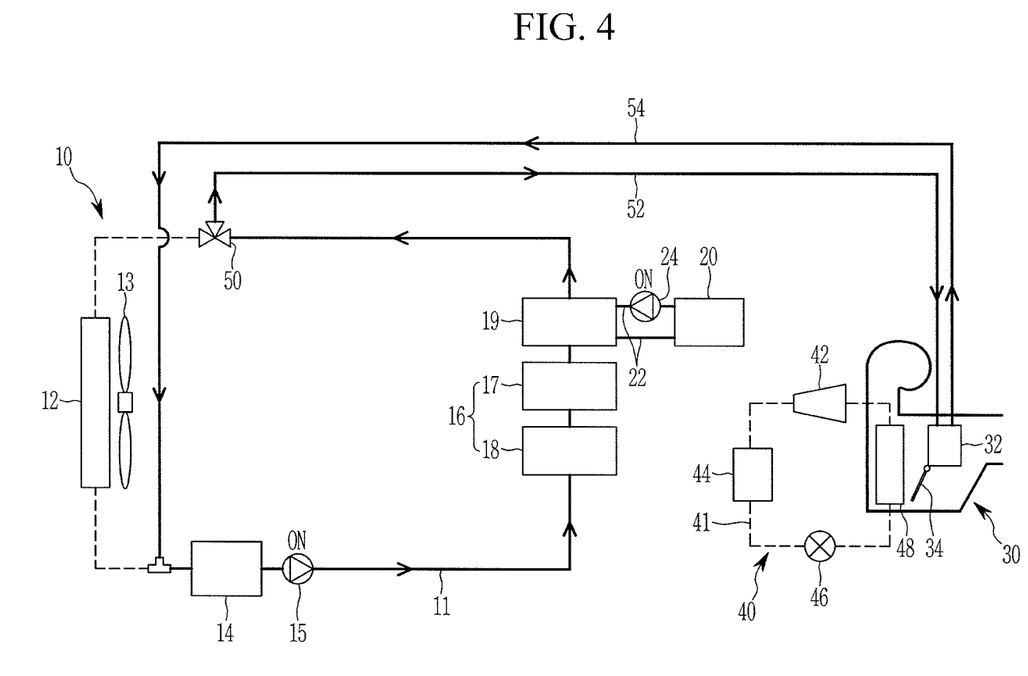
FIG. 4 is an operational view exemplarily illustrating a state in which the thermal management system for a vehicle according to the various exemplary embodiments of the present invention recovers waste heat from the electrical components and the drive motor in a heating mode of a vehicle.

FIG. 4 is an operational view exemplarily illustrating a state in which the thermal management system for a vehicle according to the various exemplary embodiments of the present invention recovers waste heat from the electrical components and the drive motor in the heating mode of vehicle.

Referring to FIG. 4, the water pump 15 of the cooling device 10 operates to circulate the coolant. In the instant case, the operation of the air conditioning device 40 is stopped.

Here, the first and second connection lines 52 and 54 are opened by the operation of the valve 50. Simultaneously, the valve 50 closes the coolant line 11 connected to the radiator 12 based on the first connection line 52.

Therefore, the coolant, which is circulated through the coolant line 11, may be circulated to the heater 32 through the opened first and second connection lines 52 and 54 in a state in which the temperature of the coolant is increased as the coolant passes through the electrical components 16 and the oil cooler 19 without passing through the radiator 12.

Meanwhile, the oil pump 24 operates to supply the drive motor 20 with the oil cooled in the oil cooler 19. The oil line 22 may remain opened by the operation of the oil pump 24.

Therefore, the waste heat generated from the drive motor 20 increases the temperature of the oil that circulates through the oil cooler 19. The oil with the increased temperature may further increase the temperature of the coolant while exchanging heat with the coolant that passes through the oil cooler 19.

Therefore, the coolant with the temperature, which is increased as the coolant passes through the electrical components 16 and the oil cooler 19, is supplied to the heater 32 through the first connection line 52 without passing through the radiator 12.

The high-temperature coolant, which has passed through the heater 32, exchanges heat with the outside air and then flows into the coolant line 11 through the second connection line 54 without passing through the radiator 12.

The coolant, which has flown into the coolant line 11, may be supplied to the heater 32 through the first connection line 52 in a state in which the temperature of the coolant is increased as the coolant repeatedly passes through the electrical components 16 and the oil cooler 19 by the operation of the water pump 15.

Meanwhile, the opening/closing door 34 is opened to allow outside air introduced into the HVAC module 30 to pass through the heater 32.

Therefore, the outside air introduced from the outside thereof is introduced at a room temperature without being cooled when the outside air passes through the evaporator 48 to which no refrigerant is supplied.

The introduced outside air flows into the vehicle interior in a state in which the temperature of the outside air is increased as the outside air exchanges heat with the high-temperature coolant while passing through the heater 32, and as a result, the vehicle interior may be heated.

That is, according to an exemplary embodiment of the present invention, the aforementioned process is repeatedly performed to recover the waste heat generated from the electrical components 16, efficiently recover the waste heat generated from the drive motor 20 through the oil cooler 19, and use the waste heat to heat the vehicle interior, and as a result, it is possible to reduce electric power to be used and improve overall heating efficiency.

Furthermore, in the exemplary embodiment of the present invention, a process of recovering the waste heat from the electrical components 16 and the drive motor 20 and cooling the electrical components 16 and the drive motor 20 in the heating mode of the vehicle will be described with reference to FIG. 5.

Figure 5:
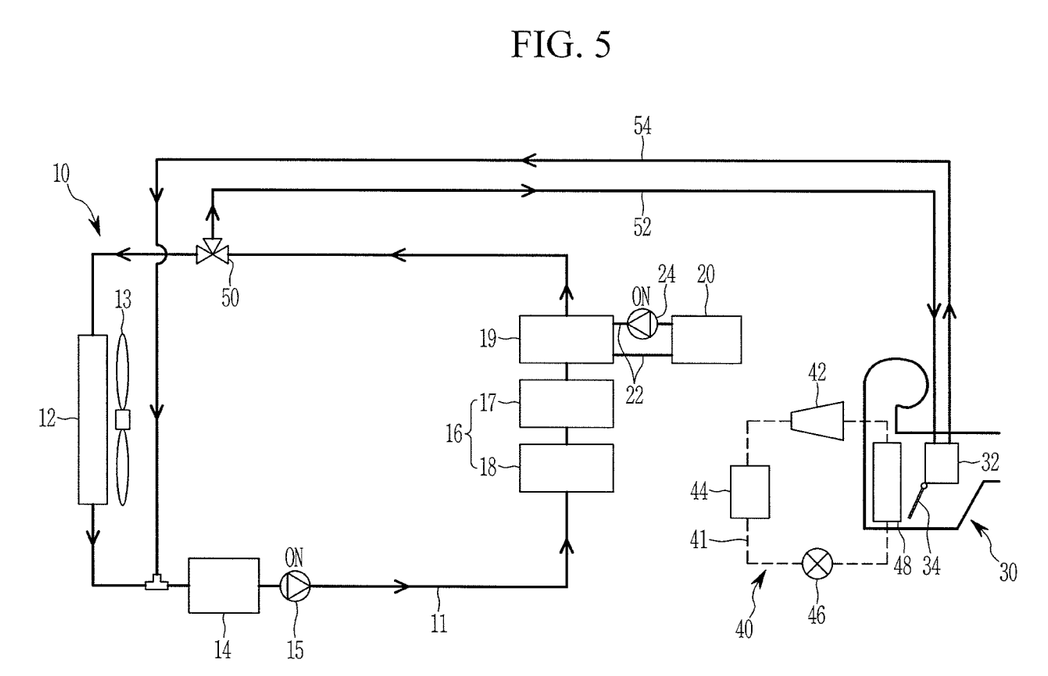
FIG. 5 is an operational view exemplarily illustrating a state in which the thermal management system for a vehicle according to the various exemplary embodiments of the present invention recovers waste heat from the electrical components and the drive motor and cools the electrical components and the drive motor in the heating mode of the vehicle.

FIG. 5 is an operational view exemplarily illustrating a state in which the thermal management system for a vehicle according to the various exemplary embodiments of the present invention recovers the waste heat from the electrical components and the drive motor and cools the electrical components and the drive motor in the heating mode of the vehicle.

Referring to FIG. 5, the water pump 15 of the cooling device 10 operates to circulate the coolant. In the instant case, the operation of the air conditioning device 40 is stopped.

Here, the first and second connection lines 52 and 54 are opened by the operation of the valve 50. Simultaneously, the valve 50 opens the coolant line 11 connected to the radiator 12 based on the first connection line 52.

Therefore, the coolant, which is circulated through the coolant line 11, passes through the electrical components 16 and the oil cooler 19, such that the temperature of the coolant is increased.

A portion of the coolant with the increased temperature may be circulated to the heater 32 through the opened first and second connection lines 52 and 54 without passing through the radiator 12.

Here, the oil pump 24 operates to supply the drive motor 20 with the oil cooled in the oil cooler 19. The oil line 22 may remain opened by the operation of the oil pump 24.

Therefore, the waste heat generated from the drive motor 20 increases the temperature of the oil that circulates through the oil cooler 19. The oil with the increased temperature may further increase the temperature of the coolant while exchanging heat with the coolant that passes through the oil cooler 19.

That is, a portion of the coolant with the temperature, which is increased as the coolant passes through the electrical components 16 and the oil cooler 19, is supplied to the heater 32 through the first connection line 52 without passing through the radiator 12.

The high-temperature coolant, which has passed through the heater 32, exchanges heat with the outside air and then flows into the coolant line 11 through the second connection line 54 without passing through the radiator 12.

Here, the opening/closing door 34 is opened to allow outside air introduced into the HVAC module 30 to pass through the heater 32.

Therefore, the outside air introduced from the outside thereof is introduced at a room temperature without being cooled when the outside air passes through the evaporator 48 to which no refrigerant is supplied.

The introduced outside air flows into the vehicle interior in a state in which the temperature of the outside air is increased as the outside air exchanges heat with the high-temperature coolant while passing through the heater 32, and as a result, the vehicle interior may be heated.

Meanwhile, the remaining portion of the coolant, which is not supplied to the heater 32, is cooled while passing through the radiator 12.

The completely cooled coolant passes through the electrical components 16 and the oil cooler 19 together with the coolant which is introduced into the coolant line 11 through the second connection line 54, recovering the waste heat and efficiently cooling the electrical components 16 and the oil cooler 19.

Furthermore, the drive motor 20 may be efficiently cooled by being supplied with the cooled oil from the oil cooler 19.

That is, according to an exemplary embodiment of the present invention, the aforementioned process is repeatedly performed to recover the waste heat generated from the electrical components 16, efficiently recover the waste heat generated from the drive motor 20 through the oil cooler 19, and use the waste heat to heat the vehicle interior, and as a result, it is possible to reduce electric power to be used and improve overall heating efficiency.

Furthermore, according to an exemplary embodiment of the present invention, a portion of the coolant is introduced into the radiator 12 and cooled and then supplied to the electrical components 16 and the oil cooler 19 by operational control of the valve 50 configured for distributing the amount of the coolant, and as a result, it is possible to efficiently cool the electrical components 16 and the drive motor 20 and ensure a performance of cooling the electrical components 16 and the drive motor 20.

Meanwhile, thermal management systems for a vehicle according to various exemplary embodiments of the present invention will be described with reference to the accompanying FIG. 6 and FIG. 7.

Figure 6:
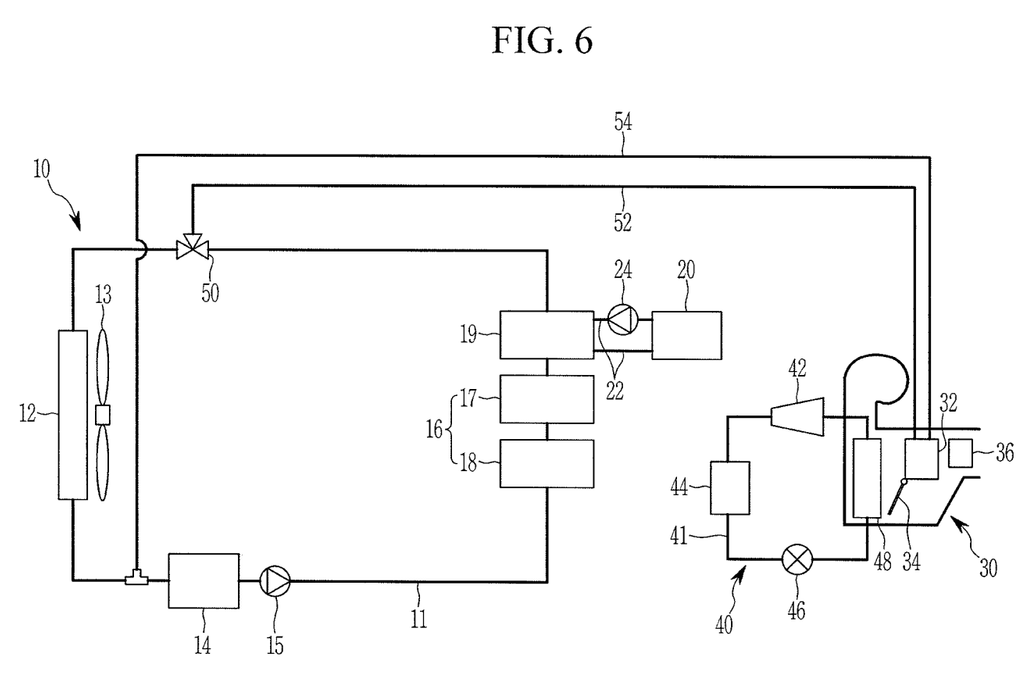
FIG. 6 and FIG. 7 are block configuration views of thermal management systems for a vehicle according to various exemplary embodiments of the present invention.

FIG. 6 is a block configuration view of the thermal management system for a vehicle according to the various exemplary embodiments of the present invention.

Referring to FIG. 6, the thermal management system for a vehicle according to the various exemplary embodiments of the present invention may include the cooling device 10 and the HVAC module 30 identical to those in the various exemplary embodiments of the present invention, and therefore a detailed description of the configurations will be omitted below.

That is, in the various exemplary embodiments of the present invention, the HVAC module 30 may further include an air heater 36 which is provided at a side opposite to the evaporator 48 with the heater 32 interposed therebetween.

The air heater 36 operates when a temperature of outside air, which completely exchanges heat with the high-temperature coolant while passing through the heater 32, is lower than a predetermined temperature or a heating target temperature. That is, when the air heater 36 operates, the outside air may be introduced into the vehicle interior in a state in which the temperature of the outside air is increased as the outside air is heated while passing through the air heater 36.

The air heater 36 may be selectively applied to supply the vehicle interior with the outside air, which has passed through the heater 32, after increasing the temperature of the outside air.

Figure 7:
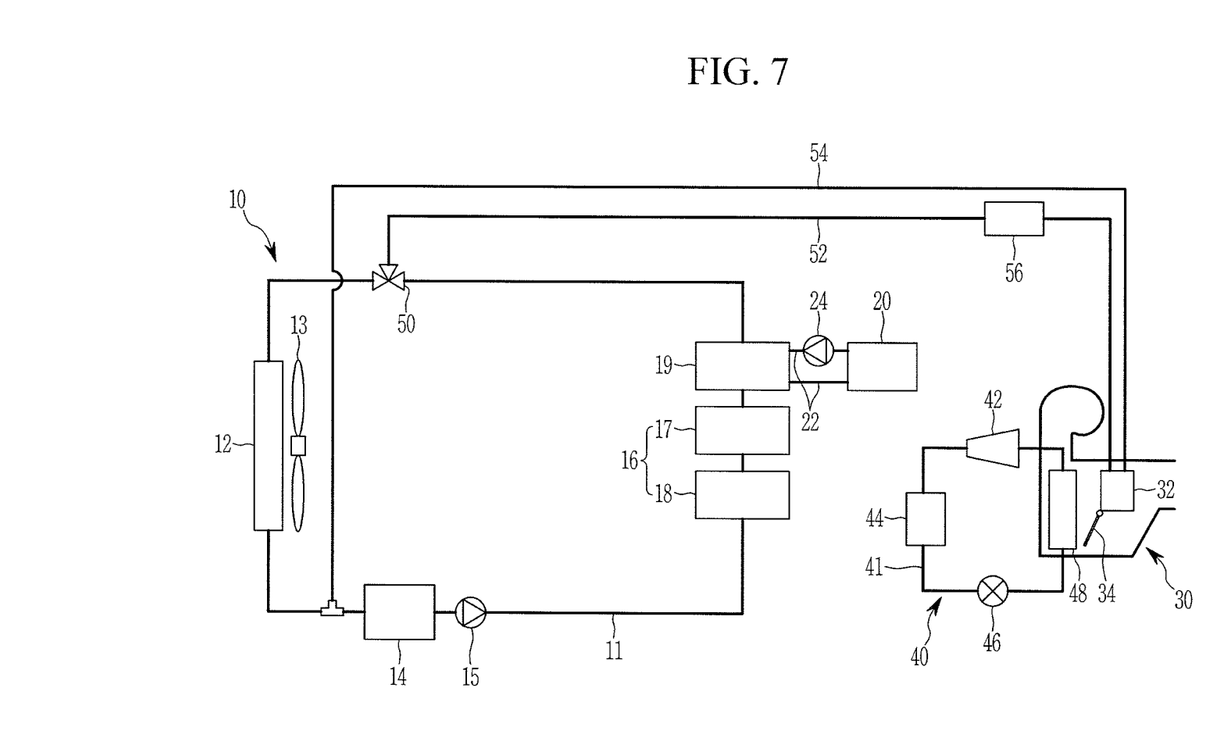

FIG. 7 is a block configuration view of the thermal management system for a vehicle according to the various exemplary embodiments of the present invention.

Referring to FIG. 7, the thermal management system for a vehicle according to the various exemplary embodiments of the present invention includes the cooling device 10 and the HVAC module 30 identical to those in the various exemplary embodiments of the present invention, and therefore a detailed description of the configurations will be omitted below.

That is, in the various exemplary embodiments of the present invention, a coolant heater 56 may be further mounted on the first connection line 52.

The coolant heater 56 operates when a temperature of the coolant, which is supplied to the heater 32 through the first connection line 52, is lower than a predetermined temperature. That is, when the coolant heater 56 operates, the coolant introduced into the first connection line 52 may be supplied to the heater 32 in a state in which the temperature of the coolant is increased as the coolant is heated while passing through the coolant heater 56.

The coolant heater 56 may be selectively applied to increase the temperature of the coolant before the coolant is supplied to the heater 32.

Therefore, as described above, by applying the thermal management systems for a vehicle according to the first, second, and various exemplary embodiments of the present invention, it is possible to ensure a performance of cooling the electrical components 16 and the drive motor 20 that release a large amount of heat in the electric vehicle, and it is possible to simplify the entire system and improve durability of the electrical components 16 and the drive motor 20.

Furthermore, according to an exemplary embodiment of the present invention, the waste heat generated from the electrical components 16 and the drive motor 20 is recovered and used to heat the vehicle interior, and as a result, it is possible to improve heat efficiency.

Furthermore, according to an exemplary embodiment of the present invention, it is possible to increase an overall traveling distance of the electric vehicle by minimizing electric power consumption by efficiently adjusting temperatures to allow the electrical components 16 and the drive motor 20 to exhibit optimum performances.

Furthermore, it is possible to reduce manufacturing costs and a weight and improve spatial utilization by simplifying the entire system.

Meanwhile, a thermal management system for a vehicle according to various exemplary embodiments of the present invention will be described with reference to the accompanying FIG. 8.

Figure 8:
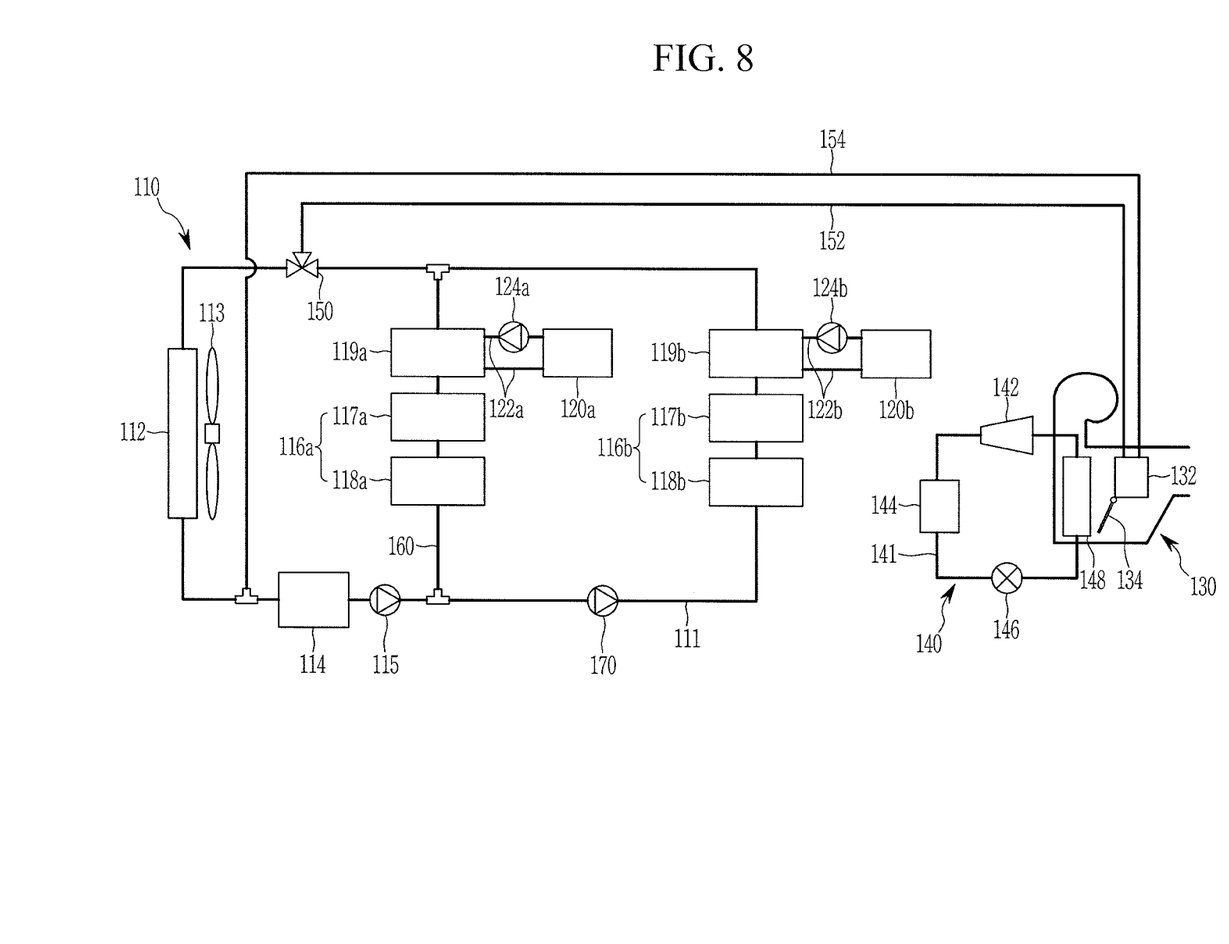
FIG. 8 is a block configuration view of a thermal management system for a vehicle according to various exemplary embodiments of the present invention.

Referring to FIG. 8, the thermal management system for a vehicle according to the various exemplary embodiments of the present invention includes a cooling device 110 and a heating, ventilation, and air conditioning (HVAC) module 130.

The cooling device 110 may include a radiator 112, electrical components, and at least one water pump 115 which are connected through a coolant line 111.

The radiator 112 is disposed at a front side of a vehicle, a cooling fan 113 is provided at a rear side of the radiator 12, and the radiator 12 cools a coolant through an operation of the cooling fan 113 and heat exchange with outside air.

The cooling device 110 circulates the coolant through the coolant line 111 to supply the coolant to the electrical components and oil coolers which are mounted on the coolant line 111 and connected to drive motors to cool the drive motors.

Here, the drive motors may include first and second drive motors 120a and 120b that correspond to a front wheel and a rear wheel, respectively.

Furthermore, the oil coolers may include first and second oil coolers 119a and 119b that correspond to both of the first and second drive motors 120a and 120b, respectively.

Here, the first and second drive motors 120a and 120b are connected to the first and second oil coolers 119a and 119b through first and second oil lines 122a and 122b, respectively. Furthermore, first and second oil pumps 124a and 124b may be mounted on the first and second oil lines 122a and 122b, respectively.

That is, the first and second oil coolers 119a and 119b may cool the oil to be supplied to the first and second drive motors 120a and 120b by use of the coolant supplied from the radiator 112.

Furthermore, the first and second oil pumps 124a and 124b may selectively operate to supply the cooled oil to the first and second drive motors 120a and 120b when the first and second drive motors 120a and 120b are required to be cooled.

In the exemplary embodiment of the present invention, with a third connection line 160 mounted on the coolant line 111, the first oil cooler 119a may be disposed in parallel with the second oil cooler 119b mounted on the coolant line 111.

That is, one end portion and the other end portion of the third connection line 160 may be connected to the coolant line 111 between the radiator 112 and the second oil cooler 119b.

Here, the water pump 115 may be disposed on the coolant line 111 adjacent to the radiator 112 based on the third connection line 160, and a sub-water pump 170 may be mounted on the coolant line 11 connected to the second oil cooler 119b based on the third connection line 160.

The sub-water pump 170 may be applied to prevent the insufficient amount of coolant caused by an increase in flow resistance to the coolant that circulates through the coolant line 111 and the third connection line 160.

Meanwhile, the electrical components may include first and second electrical components 116a and 116b that correspond to the first and second drive motors 120a and 120b, respectively.

The first electrical components 116a may include a first inverter 117a and a first charger 118a (on board charger, OBC) mounted on the third connection line 160, and the second electrical components 116b may include a second inverter 117b and a second charger 118b disposed on the coolant line 111 in parallel with the first electrical components 116a.

The first and second electrical components 116a and 116b configured as described above are mounted on the coolant line 111 and the third connection line 160, respectively, and may be cooled in a water-cooled manner.

Therefore, in a case in which the waste heat is recovered from the first and second electrical components 116a and 116b in the heating mode of the vehicle, the waste heat may be recovered from the first and second inverters 117a and 117b and the first and second chargers 118a and 118b through the heat exchange with the coolant.

Furthermore, in the heating mode of the vehicle, the waste heat generated from the first and second drive motors 120a and 120b may be recovered through the heat exchange with the coolant that cools the first and second oil coolers 119a and 119b.

That is, in the heating mode of the vehicle, the first and second oil pumps 124a and 124b operate to recover the waste heat generated from the first and second drive motors 120a and 120b.

As such, the oil cooled in the first and second oil coolers 119a and 119b cools the first and second drive motors 120a and 120b through the first and second oil lines 122a and 122b, such that the temperature of the oil is increased.

The oil with the increased temperature may increase the temperature of the coolant while being cooled by exchanging heat with the coolant in the first and second oil coolers 119a and 119b.

Therefore, the waste heat generated from the first and second drive motors 120a and 120b may be recovered by the aforementioned process.

Furthermore, the HVAC module 130 may have therein a heater 132 which is connected to the coolant line 111 through first and second connection lines 152 and 154 to supply the coolant with the temperature which is increased as the coolant passes through the first and second electrical components 116a and 116b and the first and second oil coolers 119a and 119b in the heating mode of the vehicle.

The HVAC module 130 may further include an opening/closing door 134 which is provided between the heater 132 and an evaporator 148 included in an air conditioning device 140 and adjusts outside air to allow the outside air to selectively pass through the heater 132.

Here, the air conditioning device 140 may further include a compressor 142, a condenser 144, and an expansion valve 146 which are connected through a refrigerant line 141.

The air conditioning device 140 configured as described above may operate when cooling the vehicle interior by use of thermal energy produced when a phase of the refrigerant is changed while the refrigerant passes through the compressor 142, the condenser 144, the expansion valve 146, and the evaporator 148.

Meanwhile, in the exemplary embodiment of the present invention, the first connection line 152 may be connected, through a valve 150, to the coolant line 111 provided between the radiator 112 and the first oil cooler 119a.

That is, one end portion of the first connection line 152 is connected to the coolant line 111 through the valve 150, and the other end portion of the first connection line 152 is connected to the heater 132.

Here, the valve 150 may be a three-way valve configured for distributing the amount of the coolant. In the heating mode or when the first and second electrical components 116a and 116b and the first and second oil coolers 119a and 119b are required to be cooled, the valve 150 may distribute the amount of the coolant to be supplied to the coolant line 111 and the first connection line 152 and supply the coolant.

Furthermore, one end portion of the second connection line 154 may be connected to the heater 132, and the other end portion of the second connection line 154 may be connected to the coolant line 111 provided between the radiator 112 and the water pump 115.

Here, a reservoir tank 114 may be mounted on the coolant line 111 between the water pump 115 and the second connection line 154 connected to the coolant line 111.

In an exemplary embodiment of the present invention, a controller is connected to the valve 150, the water pump 115, the sub-pump 170 and the door 134 so that the controller can perform the thermal management by controlling the valve 150, the water pump 115, the sub-pump 170 and the door 134

Therefore, by applying the thermal management system for a vehicle according to the various exemplary embodiments of the present invention which is configured as described above, it is possible to ensure a performance of cooling the first and second electrical components 116a and 116b and the first and second drive motors 120a and 120b that release a large amount of heat in the electric vehicle, and it is possible to simplify the entire system and improve durability of the first and second electrical components 116a and 116b and the first and second drive motors 120a and 120b.

Furthermore, according to an exemplary embodiment of the present invention, the waste heat generated from the first and second electrical components 116a and 116b and the first and second drive motors 120a and 120b is recovered and used to heat the vehicle interior, and as a result, it is possible to improve heat efficiency.

Furthermore, according to an exemplary embodiment of the present invention, it is possible to increase an overall traveling distance of the electric vehicle by minimizing electric power consumption by efficiently adjusting the temperatures to allow the first and second electrical components 116a and 116b and the first and second drive motors 120a and 120b to exhibit optimum performances.

Furthermore, it is possible to reduce manufacturing costs and a weight and improve spatial utilization by simplifying the entire system.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A thermal management system for a vehicle, the thermal management system comprising:
   a cooling device which includes a radiator, electrical components, and a water pump which are connected through a coolant line to circulate a coolant through the coolant line to supply the coolant to the electrical components and an at least one oil cooler which is mounted on the coolant line and connected to at least one drive motor to cool the at least one drive motor; and
   a heating, ventilation, and air conditioning (HVAC) module which has a heater connected to the coolant line through first and second connection lines to supply the coolant with a temperature which is increased as the coolant passes through the electrical components and the at least one oil cooler in a heating mode of the vehicle.

2. The thermal management system of claim 1, wherein the at least one drive motor is connected to the at least one oil cooler through at least one oil line, and at least one oil pump is mounted on the at least one oil line.

3. The thermal management system of claim 2, wherein the at least one oil pump operates when cooling the at least one drive motor or recovering waste heat generated from the at least one drive motor.

4. The thermal management system of claim 3, wherein a reservoir tank is mounted on the coolant line between the water pump and the second connection line connected to the coolant line.

5. The thermal management system of claim 1,
   wherein the first connection line is connected to a valve mounted on the coolant line between the radiator and the at least one oil cooler, and
   wherein the second connection line is connected to the coolant line between the radiator and the water pump.

6. The thermal management system of claim 5, wherein when cooling the electrical components and the at least one oil cooler, the first and second connection lines are closed by an operation of the valve, and the coolant cooled in the radiator is supplied to the electrical components and the at least one oil cooler by an operation of the water pump.

7. The thermal management system of claim 5, wherein in the heating mode of the vehicle, a portion of the coolant line, which is connected to the radiator based on the first connection line, is closed by the valve while the first and second connection lines are opened by the operation of the valve, and the coolant with the temperature, which is increased as the coolant passes through the electrical components and the at least one oil cooler by the operation of the water pump, is supplied to the heater without passing through the radiator.

8. The thermal management system of claim 5, wherein when cooling the electrical components and the at least one oil cooler in the heating mode of the vehicle, a portion of the coolant line, which is connected to the radiator based on the first connection line, is opened while the first and second connection lines are opened by the operation of the valve, a first portion of the coolant with the temperature, which is increased as the coolant passes through the electrical components and the at least one oil cooler by the operation of the water pump, is supplied to the heater, and a second portion of the coolant passes through the radiator and is supplied to the electrical components and the at least one oil cooler.

9. The thermal management system of claim 5, wherein the valve is a three-way valve configured for distributing an amount of the coolant.

10. The thermal management system of claim 1, wherein the HVAC module further includes a door which is mounted between the heater and an evaporator included in an air conditioning device and adjusts outside air to allow the outside air to selectively pass through the heater to the evaporator.

11. The thermal management system of claim 1, wherein the HVAC module further includes an air heater which is provided at a side opposite to the evaporator with the heater mounted between the evaporator and the air heater.

12. The thermal management system of claim 1, wherein a coolant heater is mounted on the first connection line.

13. The thermal management system of claim 1,
wherein the at least one drive motor include first and second drive motors provided to correspond to a front wheel and a rear wheel, respectively,
wherein the at least one oil cooler include first and second oil coolers provided to correspond to the first and second drive motors, respectively, and
wherein the first oil cooler is mounted on a third connection line connecting first and second portions of the coolant line by bypassing the second oil cooler, the second oil cooler mounted on the coolant line in parallel with the first oil cooler mounted on the third connection line.

14. The thermal management system of claim 13,
wherein the first drive motor is connected to the first oil cooler through a first oil line, and the first oil pump is mounted on the first oil line, and
wherein the second drive motor is connected to the second oil cooler through a second oil line, and the second oil pump is mounted on the second oil line.

15. The thermal management system of claim 14,
wherein the water pump is mounted on the coolant line between the radiator and the second portion of the coolant line, and
wherein a sub-water pump is mounted on the coolant line between the second portion of the coolant line and the second oil cooler.

16. The thermal management system of claim 13,
wherein the first portion of the coolant line is positioned between the valve and the second oil cooler, and
wherein the second portion of the coolant line is positioned between the water pump and the second oil cooler.

17. The thermal management system of claim 1, wherein the electrical components include an inverter and a charger.

* * * * *